(12) United States Patent
Gunreben (10) Patent No.: US 9,463,776 B2
(45) Date of Patent: Oct. 11, 2016

(54) METHOD FOR ACTUATING A CLOSURE ELEMENT ARRANGEMENT IN A MOTOR VEHICLE

(71) Applicant: Brose Fahrzeugteile GmbH & Co. KG, Hallstadt, Hallstadt (DE)

(72) Inventor: Andre Gunreben, Hallstadt (DE)

(73) Assignee: Brose Fahrzeugteile GmbH & Co. KG, Hallstadt, Hallstadt (DE)

( * ) Notice: Subject to any disclaimer, the term of this patent is extended or adjusted under 35 U.S.C. 154(b) by 0 days.

(21) Appl. No.: 14/398,335

(22) PCT Filed: May 2, 2013

(86) PCT No.: PCT/EP2013/001296
§ 371 (c)(1),
(2) Date: Oct. 31, 2014

(87) PCT Pub. No.: WO2013/164090
PCT Pub. Date: Nov. 7, 2013

(65) Prior Publication Data
US 2015/0134208 A1    May 14, 2015

(30) Foreign Application Priority Data
May 2, 2012   (DE) .................. 10 2012 008 530

(51) Int. Cl.
*B60R 25/20* (2013.01)
*E05F 15/73* (2015.01)

(52) U.S. Cl.
CPC ........... *B60R 25/2054* (2013.01); *E05F 15/73* (2015.01); *E05Y 2400/852* (2013.01); *E05Y 2400/858* (2013.01); *E05Y 2800/40* (2013.01); *E05Y 2900/546* (2013.01)

(58) Field of Classification Search
None
See application file for complete search history.

(56) References Cited

U.S. PATENT DOCUMENTS

| 8,284,022 B2 | 10/2012 | Kachouh |
| 8,421,482 B2 | 4/2013 | Mueller et al. |

(Continued)

FOREIGN PATENT DOCUMENTS

| DE | 102004048329 | 4/2006 |
| DE | 202005020140 | 6/2007 |

(Continued)

OTHER PUBLICATIONS

"International Search Report & Written Opinion," for PCT/EP2013/001296, mailed Jul. 15, 2013 (10 pages).

*Primary Examiner* — Thomas Tarcza
*Assistant Examiner* — Garrett Evans
(74) *Attorney, Agent, or Firm* — Pauly, DeVries Smith & Deffner, LLC (57) ABSTRACT

The invention relates to a method for actuating a closure element arrangement in a motor vehicle, wherein the closure element arrangement has a closure element, a drive arrangement associated with the closure element, a control arrangement and a sensor arrangement having at least one sensor element that is particularly in the form of a proximity sensor, wherein operator control event monitoring involves the control arrangement being used to monitor the sensor measured values from the sensor arrangement for whether there is a predetermined operator control event, and the result of the operator control event monitoring is taken as a basis for actuating the drive arrangement, the mechanical configuration of the motor vehicle being able to be altered by an adjusting process and/or by a fitting process during use based on normal operation.

20 Claims, 4 Drawing Sheets

(56) References Cited

U.S. PATENT DOCUMENTS

| | | | |
|---|---|---|---|
| 2005/0068712 A1* | 3/2005 | Schulz | E05B 81/78 361/287 |
| 2008/0068145 A1* | 3/2008 | Weghaus | B60R 25/2054 340/426.25 |
| 2010/0287837 A1 | 11/2010 | Wuerstlein et al. | |
| 2011/0118946 A1* | 5/2011 | Reimann | B60R 25/2036 701/49 |

FOREIGN PATENT DOCUMENTS

| | | |
|---|---|---|
| DE | 202006013335 | 1/2008 |
| DE | 102010036646 | 2/2012 |
| DE | 102012008530 | 11/2013 |
| EP | 1902912 | 3/2008 |
| JP | 2005133529 | 5/2005 |
| WO | 2013164090 | 11/2013 |

\* cited by examiner

METHOD FOR ACTUATING A CLOSURE ELEMENT ARRANGEMENT IN A MOTOR VEHICLE

CROSS-REFERENCE TO RELATED APPLICATIONS

This application is a national stage application under 35 U.S.C. 371 of Inter-national Patent Application Serial No. PCT/EP2013/001296, entitled "Verfahren zur Ansteuerung einer Verschlusselementanodnung eines Kraftfahrzeugs," filed May 2, 2013, which claims priority from German Patent Application No. DE 10 2012 008 530.3, filed May 2, 2012, the disclosures of which are incorporated herein by reference.

FIELD OF THE TECHNOLOGY

The invention relates to a method for actuating a closure element arrangement in a motor vehicle and to a control arrangement for carrying out a method.

BACKGROUND

Motor vehicles today are increasingly equipped with closure elements that can be operated by a motor. By way of example, such closure elements may be doors, such as side doors and tailgates, particularly sliding doors, hatches, particularly rear hatches, boot lids, bonnets, cargo space floors or the like in a motor vehicle. In this respect, the term "closure element" has a broad meaning in the present case.

An added-convenience function that is becoming increasingly important today is the automatic operation of the motor-driven rear hatch of a motor vehicle. In the case of the known method (DE 20 2005 020 140 U1) on which this invention is based, provision is made for an operator control event from the operator, in this case a foot movement by the operator, to prompt the motor-driven opening of the rear hatch.

The known method makes use of a control arrangement and a sensor arrangement, and in the course of operator control event monitoring the control arrangement is used to monitor the sensor measured values from the sensor arrangement to determine whether there is a predetermined operator control event.

The sensor arrangement has two capacitive sensors that extend over the entire width of the motor vehicle. An operator control event, in this case a foot movement by the operator, can easily be sensed electronically.

Difficulties can arise when, during use based on normal operation, the mechanical configuration of the motor vehicle is altered by an adjusting process or by a fitting process. By way of example, such a change of configuration can trace back to the fitting or adjustment of tow couplings, bicycle holders, roofracks or the like. In principle, these motor vehicle components can disturb the sensing of the operator control events by the sensor arrangement. This applies particularly when the control arrangement and the sensor arrangement are optimized for a quite particular configuration, particularly for a configuration without tow coupling or the like.

The invention is based on the problem of designing and developing the known method such that robust operator control event monitoring is ensured even when the configuration of the motor vehicle changes.

SUMMARY

The above problem is solved for a method as described herein.

A fundamental aspect is the basic consideration that the operator control event monitoring can be conditioned to the mechanical configuration of the motor vehicle in order to obtain optimum monitoring results.

Specifically, it is proposed that the control arrangement be first of all used to sense the mechanical configuration of the motor vehicle and that the operator control event monitoring be then modified on the basis of the respectively ascertained mechanical configuration of the motor vehicle. This means quite generally that a change of configuration for the motor vehicle can result in modification of the operator control event monitoring so that a good monitoring result is ensured even after the change of configuration. The term "modification" of the operator control event monitoring has a broad meaning in the present case. It quite generally comprises a change in the parameterization of the operator control event monitoring.

By way of example, the mechanical configuration can be sensed by sensors that are associated with the respective motor vehicle component. It is also conceivable for changes of configuration to be made by motor-driven adjustments that are triggered and recorded by the control arrangement.

In an embodiment, a change of configuration involves, by way of example, a tow coupling being extended into an operating position or being fitted to the motor vehicle as appropriate. Particularly if the operator control event to be monitored is a foot movement by the operator, it is possible for a change of configuration relating to the tow coupling to result in shadowing and reflection effects that adversely affect the monitoring result.

Some measures for modifying the operator control event monitoring are described to herein. These clarify the broad comprehension of the term "modification" of the operator control event monitoring in the present case. The modification ranges from a change in threshold values through the change in the operator control event model on which the operator control event monitoring is based to a change in the actuation of the sensor arrangement.

According to an embodiment a control arrangement for carrying out the method based on the proposal is described herein.

Reference may be made to all the comments pertaining to the method based on the proposal that are suitable for explaining the control arrangement.

In an embodiment, a method for actuating a closure element arrangement in a motor vehicle, wherein the closure element arrangement has a closure element, a drive arrangement associated with the closure element, a control arrangement and a sensor arrangement having at least one sensor element that is particularly in the form of a proximity sensor, wherein operator control event monitoring involves the control arrangement being used to monitor the sensor measured values from the sensor arrangement for whether there is a predetermined operator control event, and the result of the operator control event monitoring is taken as a basis for actuating the drive arrangement, the mechanical configuration of the motor vehicle being able to be altered by an adjusting process and/or by a fitting process during use based on normal operation, wherein the control arrangement is used to sense the mechanical configuration of the motor vehicle and the operator control event monitoring is modified on the basis of the mechanical configuration of the motor vehicle.

In an embodiment, the mechanical configuration of the motor vehicle comprises the mechanical configuration of the closure element, particularly the position of the closure element.

In an embodiment, a tow coupling can be extended into an operating position by way of a change of configuration or can be fitted to the motor vehicle in an operating position, and/or in that a bicycle carrier can be fitted to the motor vehicle in an operating position by way of a change of configuration.

In an embodiment, at least one operator control event is defined as a foot movement by the operator, such as the sensor arrangement has at least one sensor element in the form of a proximity sensor that is arranged in or on a rear panelling portion, particularly the rear bumper, of a motor vehicle and that in some embodiments extends over a substantial portion of the width of the motor vehicle, such as in that at least one operator control event is defined as a to and fro movement by the foot of the operator, such as in that during the operator control event the at least one sensor element produces a pulsed time profile for the sensor measured values—sensor pulse.

In an embodiment, a predetermined change of configuration, particularly the adjustment or fitting of a tow coupling to an operating position, prompts a decrease in sensor measured values as a result of shadowing and reflection effects or the like.

In an embodiment, the operator control event monitoring is designed such that the sensing of sensor measured values, particularly of sensor pulses, above an upper threshold and/or below a lower threshold is not associated with an operator control event and in that the configuration of the motor vehicle is taken as a basis for altering the upper threshold and/or the lower threshold, such as in that adjustment or fitting of a tow coupling to an operating position involves the upper threshold and/or the lower threshold being lowered.

In an embodiment, when the closure element is in the open position the operator control event monitoring is conditioned such that the dangling and possibly swinging legs of a person sitting in the bodywork opening associated with the closure element are not sensed as an operator control event in the course of operator control event monitoring.

In an embodiment, an operator control event has an associated operator control event model comprising signal characteristics, in that in the course of the operator control event monitoring the control arrangement is used to monitor whether the sensor measured values correspond to the signal characteristics of the operator control event model and in that the operator control event model is produced on the basis of the mechanical configuration of the motor vehicle or is selected from a number of stored operator control event models on the basis of the mechanical configuration of the motor vehicle or is parameterized on the basis of the mechanical configuration of the motor vehicle.

In an embodiment, an operator control event has an associated operator control event set of characteristics comprising signal characteristics, in that in the course of the operator control event monitoring the control arrangement is used to monitor whether the sensor measured values correspond to the signal characteristics of the operator control event set of characteristics and in that the operator control event set of characteristics is produced on the basis of the mechanical configuration of the motor vehicle or is selected from a number of stored operator control event sets of characteristics on the basis of the mechanical configuration of the motor vehicle or is parameterized on the basis of the mechanical configuration of the motor vehicle.

In an embodiment, at least one operator control event produces a pulsed time profile for sensor measured values from at least one sensor element and in that at least one signal characteristic is/are defined as a width and/or as a height and/or as an edge gradient and/or as a curvature of portions of the sensor pulses and/or as a time offset between two sensor pulses from a sensor element.

In an embodiment, the course of the operator control event monitoring the sensor measured values are ascertained by means of the control arrangement on the basis of a signal processing method, in that the signal processing method is defined by a signal processing set of parameters with signal processing parameters such as minimum signal level, temporal measurement resolution or amplitude measurement resolution and in that the signal processing set of parameters is selected from a number of stored signal processing sets of parameters on the basis of the mechanical configuration of the motor vehicle or is parameterized on the basis of the mechanical configuration of the motor vehicle.

In an embodiment, the operator control event monitoring comprises digitization of the sensor measured values and in that the subsequent evaluation of the digitized measurement data, particularly the matching against the operator control event set of characteristics, is performed on the basis of an evaluation method, in that the evaluation method is defined by an evaluation set of parameters with evaluation parameters such as computation accuracy or the type of matching algorithm, and in that the evaluation set of parameters is selected from a number of stored evaluation sets of parameters on the basis of the mechanical configuration of the motor vehicle or is parameterized on to the basis of the mechanical configuration of the motor vehicle.

In an embodiment, the course of the operator control event monitoring the sensor arrangement is actuated by means of the control arrangement on the basis of the mechanical configuration of the motor vehicle, such as in that the sensor arrangement is arranged in or on a rear panelling portion, particularly the rear bumper, of the motor vehicle and in some embodiments extends over a substantial portion of the width of the motor vehicle, in that the sensor arrangement is in elongate form and has, over its length, at least two sensor sections that can be actuated separately from one another by means of the control arrangement and in that the sensor sections are actuated individually, in groups or altogether on the basis of the configuration of the motor vehicle.

In an embodiment, the sensor arrangement has sensor sections on both sides of the tow coupling and at least one sensor section in the region of the tow coupling and in that, when the tow coupling is fitted or adjusted to the operating position, exclusively the sensor sections of the sensor arrangement that are on both sides of the tow coupling are actuated and in that otherwise at any rate the at least one sensor section of the sensor arrangement that is in the region of the tow coupling is also actuated.

In an embodiment, a control arrangement for carrying out the method disclosed herein is provided.

BRIEF DESCRIPTION OF THE FIGURES

The invention is explained in more detail below with reference to a drawing that shows just one exemplary embodiment and in which.

DETAILED DESCRIPTION

The method based on the proposal is explained below with reference to a closure element arrangement 1 in a motor vehicle, said closure element arrangement having a closure element 2 in the form of a rear hatch. The refinement of the closure element 2 as a rear hatch of a motor vehicle is provided in an embodiment. However, reference may be made to the introductory part of the description in respect of the broad comprehension of the term "closure element". In this respect, all the comments pertaining to a rear hatch 2 apply correspondingly to all other types of closure elements.

Figure 1:
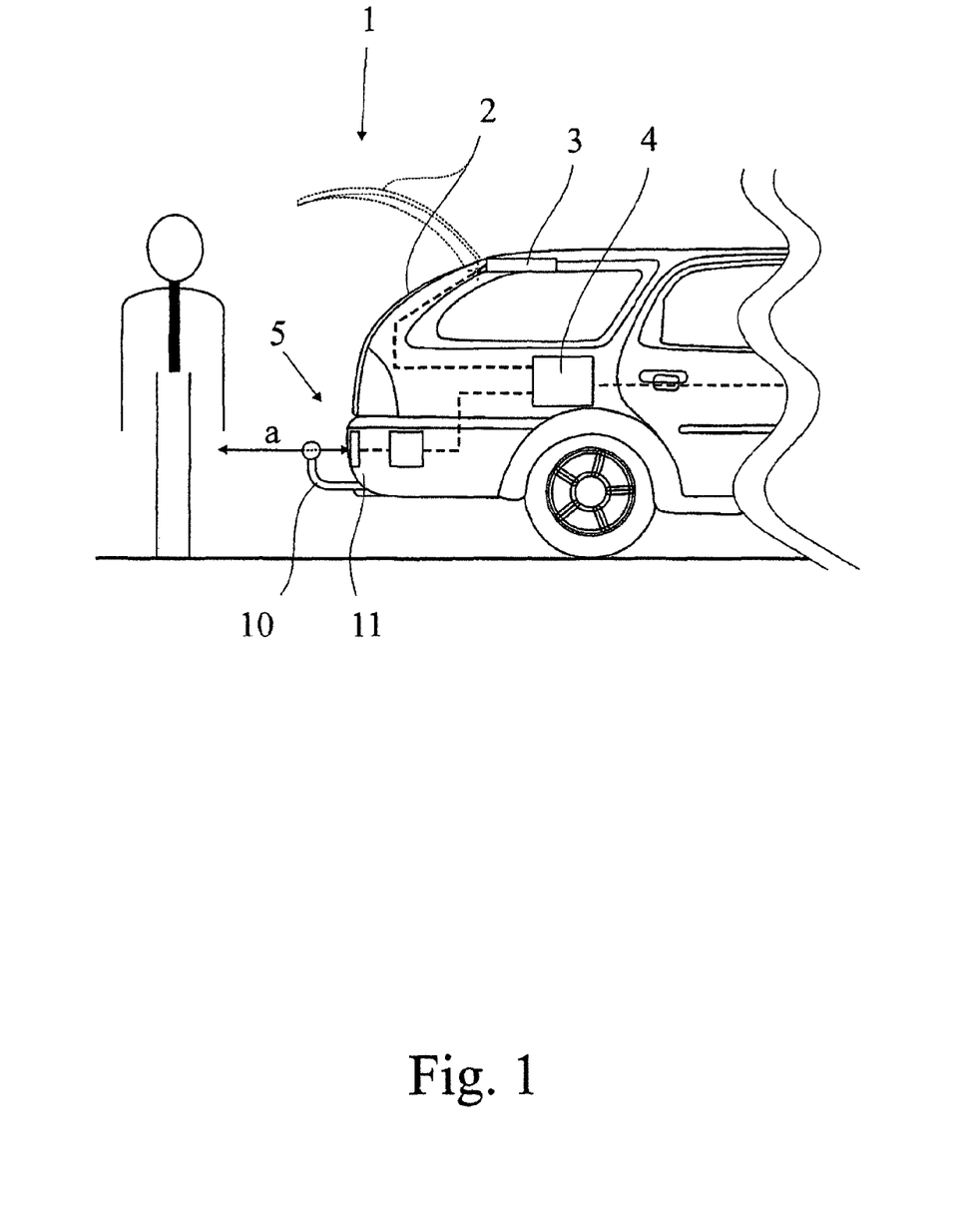
FIG. 1 shows the rear region of a motor vehicle with a closure element arrangement based on the proposal for carrying out the method based on the proposal.

The rear hatch 2 has an associated drive arrangement 3 that can be used to prompt motor-driven adjustment of the rear hatch 2 between the closed position shown in a solid line in FIG. 1 and the open position shown in a dashed line in FIG. 1.

In addition, a control arrangement 4 is provided that is used for actuating the drive arrangement 3, inter alia. A sensor arrangement 5 having at least one sensor element 6, 7 in the form of a proximity sensor communicates with the control arrangement 4. The sensor arrangement 5, which is yet to be explained, is designed such that it can be used to sense operator control movements.

In the exemplary embodiment shown, the control arrangement 4 has a central hardware structure. Alternatively, it is conceivable for the control arrangement 4 to have a local hardware structure. In this case, a portion of the control hardware is some instances accommodated in the sensor arrangement 5. This means that the sensor arrangement 5 has dedicated intelligence that can be used for signal preprocessing, for example.

In this case, particular operator control movements are defined as operator control events that are each meant to trigger a particular reaction from the control arrangement 4. In an embodiment, the operator control event is a foot movement by the operator, which is yet to be explained.

In order to be able to react to the presence of operator control events as mentioned above, provision is made for operator control event monitoring that is performed by the control arrangement 4. In the course of the operator control event monitoring, the control arrangement 4 is used to monitor the sensor measured values 8, 9 from the sensor arrangement 5 for whether or not there is a predetermined operator control event. The sensor events may be arbitrary discrepancies in the sensor measured values 8, 9 from the idle sensor measured values. The idle sensor measured values 8, 9 obtain when there is no external influencing of the sensor arrangement 5 by an operator or the like. On the basis of the result of the operator control event monitoring, the drive arrangement 3 is actuated as appropriate, for example the rear hatch 2 is opened by a motor.

During use based on normal operation, it is possible for the mechanical configuration of the motor vehicle to be altered by an adjusting process and/or by a fitting process in a manner that is yet to be explained. The term "use based on normal operation" means that it is possible for the mechanical configuration of the motor vehicle to be altered without the need to visit a workshop performing maintenance on the motor vehicle.

The mechanical configuration of the motor vehicle can be sensed for control purposes by means of the control arrangement 4 by virtue of the motor vehicle component in question having an appropriate associated status sensor that can be read by the control arrangement 4. It is also conceivable for the configuration to remain purely for control purposes, as explained above.

A fundamental aspect is now that the control arrangement 4 is used to sense the mechanical configuration of the motor vehicle and that the operator control event monitoring is modified on the basis of the mechanical configuration of the motor vehicle. The effect that can be achieved by this, in a manner that is yet to be explained, is that a good monitoring result is ensured even after a change of configuration for the motor vehicle.

The mechanical configuration of the motor vehicle in the present sense may comprise a multiplicity of subconfigurations. By way of example, the mechanical configuration of to the motor vehicle in this case and in some embodiments comprises the mechanical configuration of the closure element 2, in this case the rear hatch 2 of the motor vehicle.

In addition, in this case a tow coupling 10 can be extended into an operating position by way of a change of configuration. It is also conceivable for the tow coupling 10 to be able to be fitted to the motor vehicle in an operating position prior to being used. Alternatively or in addition, provision may be made for a change of configuration to involve a bicycle carrier being fitted to the motor vehicle in an operating position.

Figure 2:
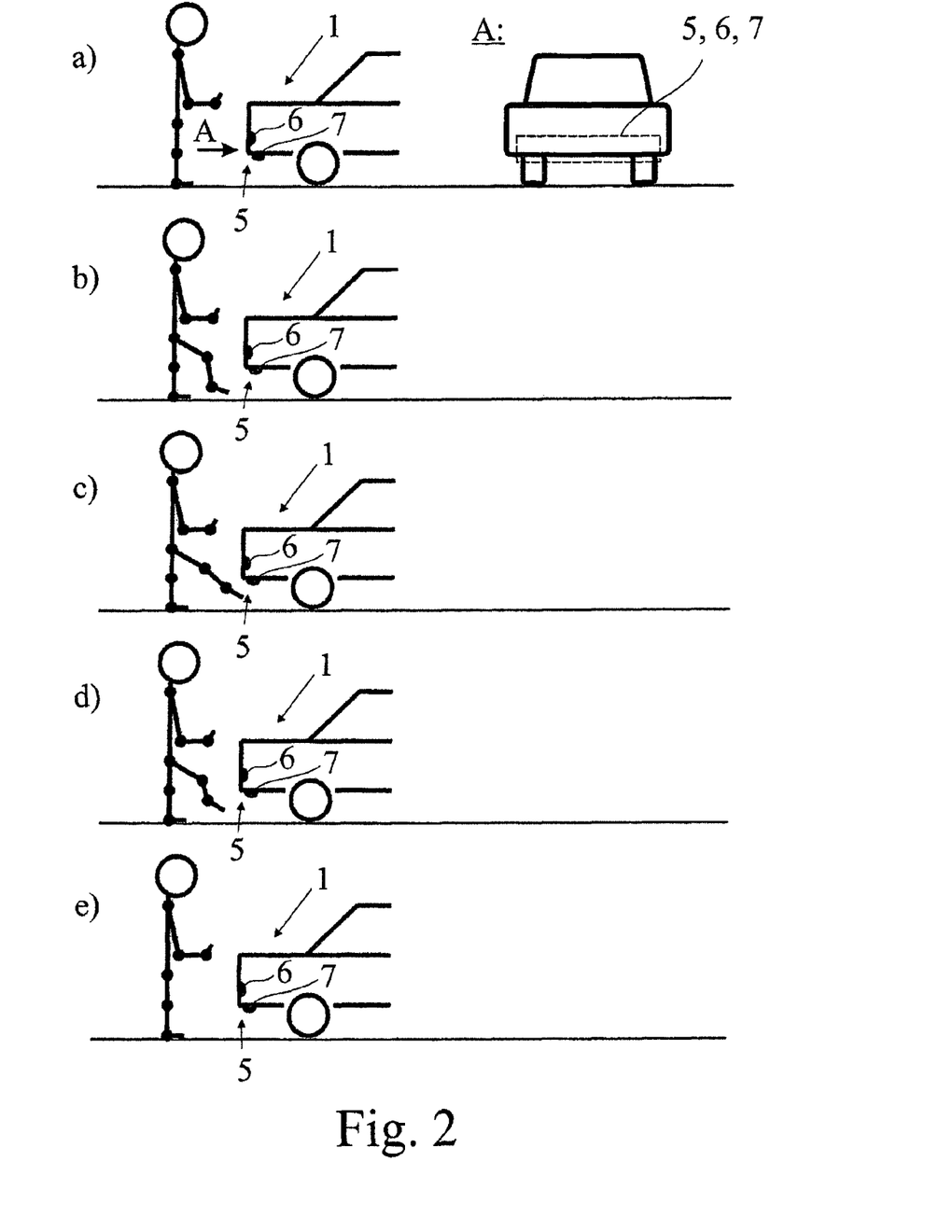
FIG. 2 shows a sequence for an operator control event to be sensed that is based on the proposal, in the five stages a) to e)

In the exemplary embodiment shown, at least one operator control event is defined as a foot movement by the operator. In this case, at least one sensor element 6, 7 is arranged in or on a rear panelling portion 11, in this case the rear bumper 11, of the motor vehicle. The at least one sensor element 6, 7 in some embodiments extends over an essential portion of the width of the motor vehicle, as is evident from the illustration shown in FIG. 2a).

Figure 3:
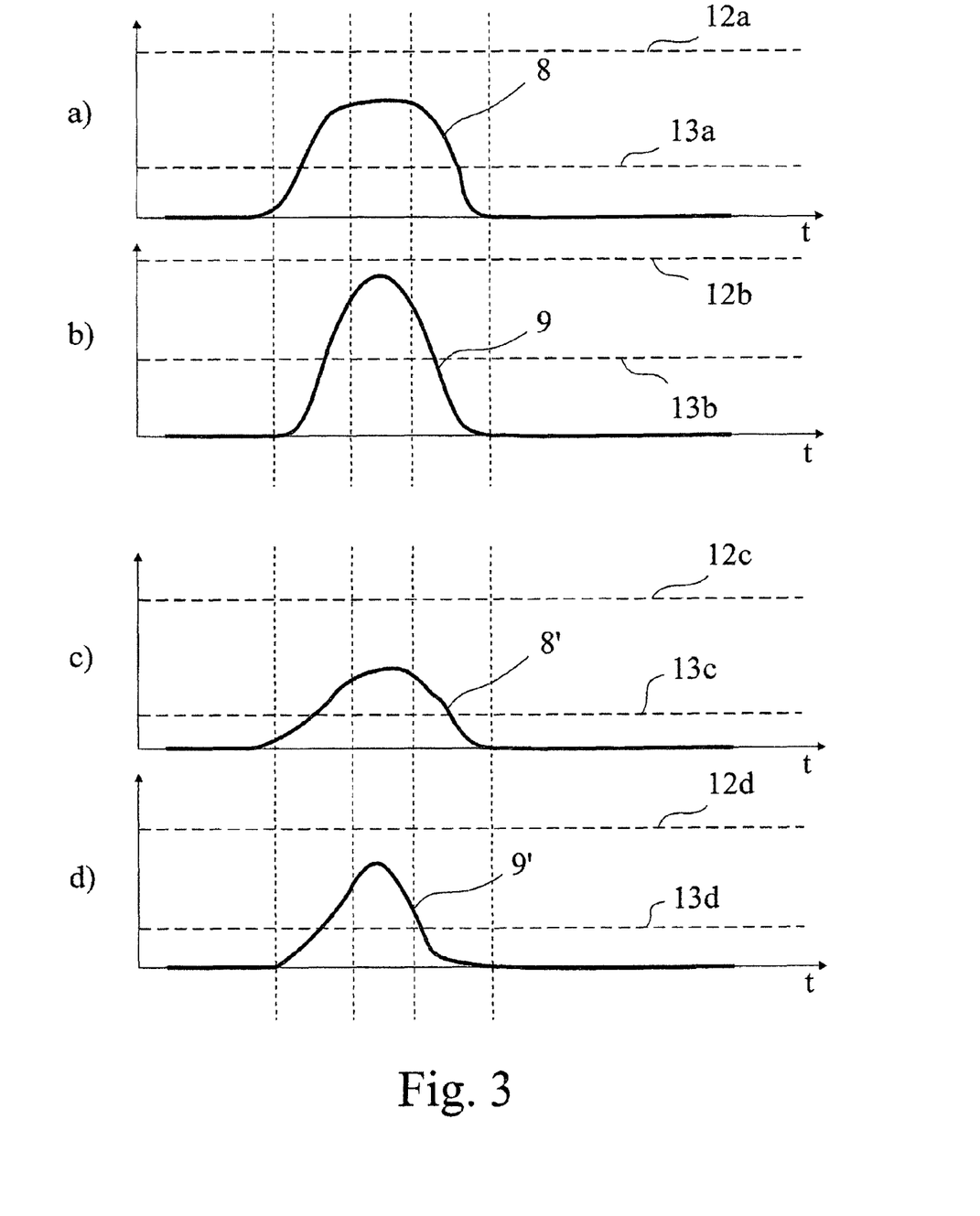
FIG. 3 shows the signal profiles of two sensor elements during an operator to control event as shown in FIG. 2a), b) with the tow coupling dismantled and c), d) with the tow coupling in the operating position.

Specifically, at least one operator control event is defined as a to and fro movement by the foot of the operator. Depictions a) to e) in FIG. 2 show the stages in the sequence of such an operator control event comprising a to and fro movement by the foot of the operator. FIGS. 3a) and b) show the resulting sensor events in the sensor measured values 8, 9 from the two sensor elements 6, 7 for the case in which the tow coupling 10 is swivelled away or dismantled. FIGS. 3c) and d) show the resulting sensor events in the sensor measured values 8', 9' from the two sensor elements 6, 7 for the case in which the tow coupling 10 is swivelled into its operating position shown in FIG. 1.

The illustration shown in FIG. 3 reveals the fact that during the operator control event the at least one sensor element 6, 7 produces a pulsed time profile for the sensor measured values 8, 9. This pulsed time profile is called a "sensor pulse" in the present case.

It has already been pointed out that the term "modification" of the operator control event monitoring can be interpreted broadly, which means that there are a large number of options for this modification. A series of modifications are explained below.

The illustration shown in FIG. 1 already reveals that a change of configuration, in this case the adjustment or fitting of the tow coupling 10 to an operating position, will prompt a decrease in sensor measured values 8, 9/8', 9' as a result of shadowing and reflection effects or the like. This is also evident from a comparison of FIGS. 3a) and b) and FIGS. 3c) and d). These clarify that the respective signal level is substantially reduced by the tow coupling 10 that is in the operating position.

The decrease in the sensor measured values 8, 9 that is described above can be taken into account by means of particularly simple modification of the operator control event monitoring. In this case, it is first of all assumed that the sensing of sensor measured values 8, 9, in this case of sensor pulses, above an upper threshold 12 and/or below a lower threshold 13 will not be associated with any operator control event. Sensor measured values 8, 9 below the lower threshold 13 are produced by passing people or the like, for example, whereas sensor measured values 8, 9 above the upper threshold 12 can be produced by a wiping movement on the panelling portion 11. For the purpose of robust operator control event monitoring, sensor measured values 8, 9 above the upper threshold 12 and below the lower threshold 13 are masked out in practice.

If, for example in the case of adjustment of the tow coupling 10 to its operating position, the values for the upper threshold 12 and the lower threshold 13 were retained, reproducible operator control event monitoring would not be possible, since the resulting sensor measured values 8', 9' will always be in the region of the respective lower threshold 13 and hence masked out or not masked out on a random basis. It is therefore proposed that the respective upper threshold 12 and/or the lower threshold 13 be altered on the basis of the configuration of the motor vehicle. Specifically, it is proposed that adjustment or fitting of a tow coupling 10 to its operating position involve the upper threshold 12 and/or the lower threshold 13 being lowered. The lowered upper thresholds 12 and lower thresholds 13 are shown in FIGS. 3c) and d). The upper thresholds 12 and lower thresholds 13 for the two sensor elements 6, 7 are different, which is indicated by the reference symbols 12a-d and 13a-d in FIG. 3. The present explanations use only the reference symbols 12, 13, for the purpose of clear illustration.

An example of modification of the operator control event monitoring on the basis of the mechanical configuration of the closure element 2, in this case the position of the rear hatch 2, is that when the rear hatch 2 is in the open position the operator control event monitoring is conditioned such that the dangling and possibly swinging legs of a person sitting in the rear hatch opening are not sensed as an operator control event in the course of the operator control event monitoring. This makes it possible to effectively prevent people who are sitting in the rear hatch opening from being put at risk in the course of an undesirable motor-driven closing process.

In a modification, it is assumed that an operator control event has an associated operator control event model comprising signal characteristics, wherein in the course of the operator control event monitoring the control arrangement 4 is used to monitor whether the sensor measured values 8, 9 correspond to the signal characteristics of the operator control event model. Such an operator control event model represents to a certain extent the form or the profile of the sensor measured values 8, 9 during an operator control event. It is now proposed that the operator control event model be produced on the basis of the mechanical configuration of the motor vehicle or be selected from a number of stored operator control event models on the basis of the mechanical configuration of the motor vehicle or be parameterized on the basis of the mechanical configuration of the motor vehicle.

In the simplest case, an operator control event has an associated operator control event set of characteristics comprising signal characteristics that are in turn matched against the sensor measured values 8, 9 in the course of the operator control event monitoring. The operator control event set of characteristics is a simple form of an operator control event model. According to the proposal, modification of the operator control event set of characteristics is accordingly proposed on the basis of the mechanical configuration of the motor vehicle.

As explained above, at least one operator control event produces a pulsed time profile for sensor measured values 8, 9 from at least one sensor element 6, 7, wherein in this case at least one signal characteristic as cited above is/are defined as a width and/or as a height and/or as an edge gradient and/or as a curvature of portions of the sensor pulses and/or as a time offset between two sensor pulses from a sensor element 6, 7.

In a further embodiment, the modification of the operator control event monitoring can relate to the signal processing method on which the ascertainment of the sensor to measured values 8, 9 by means of the control arrangement 4 is based. In this case, provision is made for the signal processing method to be defined by a signal processing set of parameters with signal processing parameters such as minimum signal level, temporal measurement resolution or amplitude measurement resolution. According to the proposal, the signal processing set of parameters is selected from a number of stored signal processing sets of parameters on the basis of the mechanical configuration of the motor vehicle or is parameterized on the basis of the mechanical configuration of the motor vehicle. By way of example, provision may be made for a tow coupling 10 in the operating position to prompt the minimum signal level, which is processed further in the first place for control purposes, to be lowered and the temporal measurement resolution and the amplitude measurement resolution to be raised, in order to take account of the comparatively low signal level when the tow coupling 10 is in the operating position.

It is also conceivable for the modification of the operator control event monitoring to relate to the evaluation of the digitized sensor measured values 8, 9. Specifically, the operator control event monitoring first of all comprises the digitization of the sensor measured values 8, 9, wherein the subsequent evaluation of the digitized measurement data, particularly the matching against an operator control event set of characteristics, is performed on the basis of an appropriate evaluation method. The evaluation method is defined by an evaluation set of parameters with evaluation parameters such as computation accuracy or the type of matching algorithm. In this case too, it is proposed that the evaluation set of parameters be selected from a number of stored evaluation sets of parameters on the basis of the mechanical configuration of the motor vehicle or be parameterized on the basis of the mechanical configuration of the motor vehicle. By way of example, it may be advantageous for the computation accuracy to be increased when the tow coupling 10 is in its operating position, in order to take account of the comparatively low signal level mentioned above.

The modification of the operator control event monitoring on the basis of the proposal can, in principle, also relate to the actuation of the sensor arrangement 5. In this case, the term "actuation" has a broad meaning and relates to all control measures that result in the sensor measured values 8, 9 being ascertained. Specifically, it is proposed in this case that in the course of the operator control event monitoring 5 the sensor arrangement 5 be actuated by means of the control arrangement 4 on the basis of the mechanical to configuration of the motor vehicle. An example of this is explained below with reference to FIG. 4.

Figure 4:
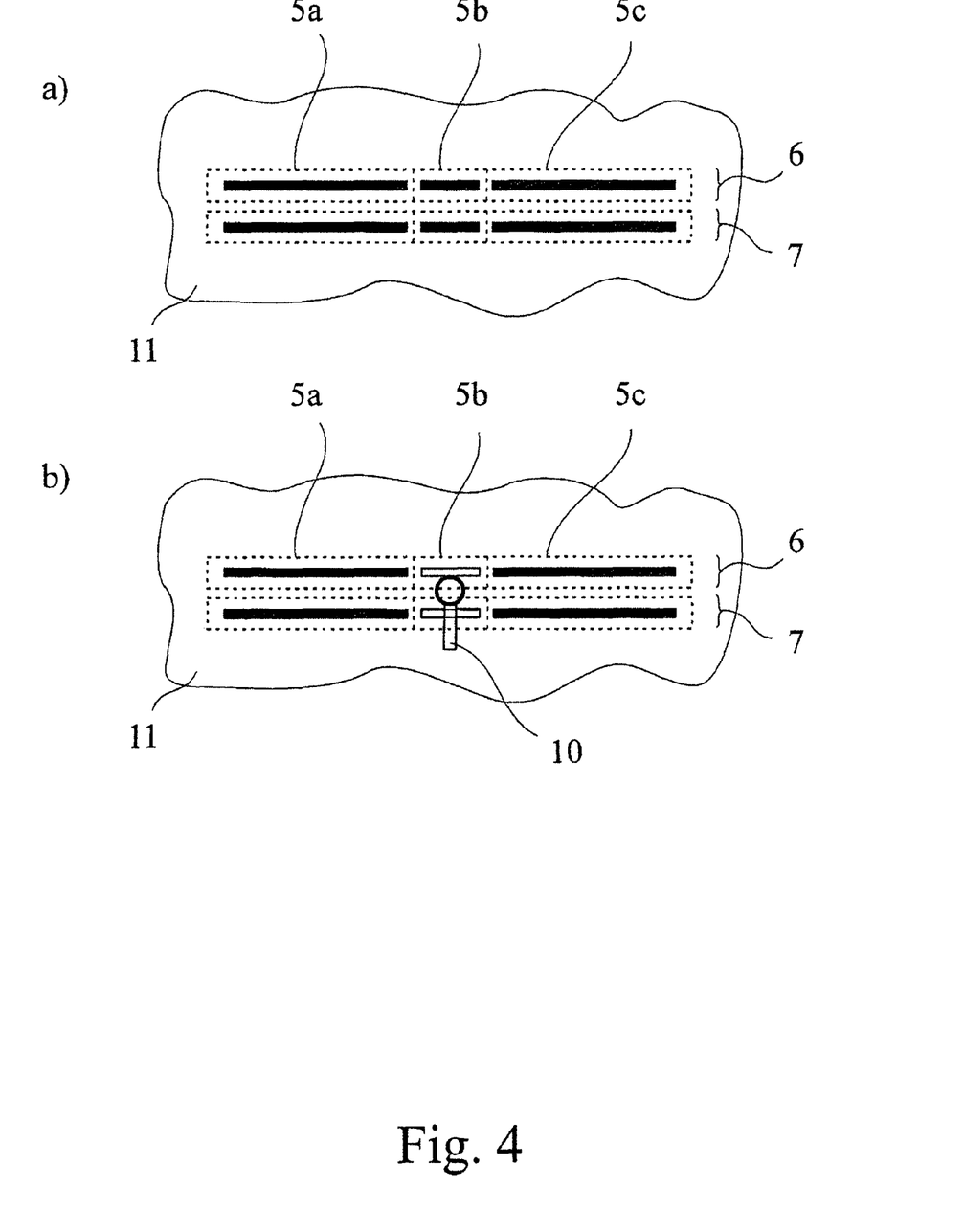
FIG. 4 shows an entirely schematic illustration of a detail from the rear apron of the rear region shown in FIG. 1 in a front view a) with the tow coupling dismantled and b) with the tow coupling in the operating position.

As shown in FIG. 4, the sensor arrangement 5 is arranged in or on a rear panelling portion 11, in this case the rear bumper 11, of the motor vehicle, the sensor arrangement 5 extending over a substantial portion of the width of the motor vehicle.

The sensor arrangement 5 is of elongate form and has, over its length, at least two sensor sections 5a, 5b, 5c that can be actuated separately from one another by means of the control arrangement 4. In the simplest case, this means that the individual sensor sections 5a, 5b, 5c can be read individually.

A fundamental aspect of the latter variant is the fact that the sensor sections 5a, 5b, 5c are actuated individually, in groups or altogether on the basis of the configuration of the motor vehicle.

In the exemplary embodiment shown in FIG. 4, a total of three sensor sections 5a, 5b, 5c are provided, of which the sensor sections 5a, 5c are arranged on both sides of the tow coupling 10 and the sensor section 5b is arranged in the region of the tow coupling 10. When the tow coupling 10 is in the operating position, exclusively the sensor sections 5a, 5c of the sensor arrangement 5 that are on both sides of the tow coupling 10 are actuated. This is the case for the configuration of the motor vehicle that is shown in FIG. 4b).

Otherwise, that is to say when the motor vehicle is configured as shown in FIG. 4a), all the sensor sections 5a, 5b, 5c of the sensor arrangement 5 are in this case actuated. This is also appropriate, since the middle sensor section 5b in FIG. 4 operates uninfluenced by the tow coupling 10 when the tow coupling 10 is swivelled away or dismantled. In the case of the configuration shown in FIG. 4b), it can be expected that the sensor measured values 8, 9 from the middle sensor arrangement 5b will be decreased by the tow coupling 10 and in this respect can make a comparatively small contribution to the operator control event monitoring.

According to further teaching that can be attributed separate significance, the control arrangement 4 based on the proposal is claimed as such. Reference may be made to all comments that are suitable for explaining the control arrangement.

The invention claimed is:

1. A method for actuating a closure element arrangement in a motor vehicle, comprising:
monitoring for an operator control event associated with a closure element arrangement in a motor vehicle, the closure element arrangement comprising a closure element, a drive arrangement associated with the closure element, a control arrangement and a sensor arrangement having at least one sensor element;
sensing a mechanical configuration of the motor vehicle with the control arrangement; and
modifying the monitoring for the operator control event based on the mechanical configuration of the motor vehicle;
wherein monitoring for the operator control event comprises
monitoring one or more sensor measured values from the sensor arrangement for whether there is a predetermined operator control event, and
using a result of the operator control event monitoring as a basis for actuating the drive arrangement; and
wherein the mechanical configuration of the motor vehicle can be altered by an adjusting process and/or by a fitting process during use based on normal operation.

2. The method according to claim 1, wherein the mechanical configuration of the motor vehicle comprises the mechanical configuration of the closure element, particularly a position of the closure element.

3. The method according to claim 1, wherein a tow coupling can be extended into an operating position by way of a change of configuration or can be fitted to the motor vehicle in an operating position, and/or in that a bicycle carrier can be fitted to the motor vehicle in an operating position by way of a change of configuration.

4. The method according to claim 1, wherein at least one operator control event is defined as a foot movement by the operator.

5. The method according to claim 1, wherein a predetermined change of configuration, comprising an adjustment or fitting of a tow coupling to an operating position prompts a decrease in sensor measured values as a result of shadowing and reflection effects.

6. The method according to claim 1, wherein the operator control event monitoring is designed such that the sensing of sensor measured values above an upper threshold and/or below a lower threshold is not associated with an operator control event and wherein the configuration of the motor vehicle is taken as a basis for altering the upper threshold and/or the lower threshold.

7. The method according to claim 1, wherein when the closure element is in an open position the operator control event monitoring is conditioned such that the dangling or swinging legs of a person sitting in the bodywork opening associated with the closure element are not sensed as an operator control event in the course of the monitoring for an operator control event.

8. The method according to claim 1, wherein an operator control event has an associated operator control event model comprising signal characteristics, wherein in the course of the monitoring for an operator control event the control arrangement is used to monitor whether the sensor measured values correspond to the signal characteristics of the operator control event model and wherein the operator control event model is produced on the basis of the mechanical configuration of the motor vehicle or is selected from a number of stored operator control event models on the basis of the mechanical configuration of the motor vehicle or is parameterized on the basis of the mechanical configuration of the motor vehicle.

9. The method according to claim 1, wherein an operator control event has an associated operator control event set of characteristics comprising signal characteristics, wherein in the course of the operator control event monitoring the control arrangement is used to monitor whether the sensor measured values correspond to the signal characteristics of the operator control event set of characteristics and wherein the operator control event set of characteristics is produced on the basis of the mechanical configuration of the motor vehicle or is selected from a number of stored operator control event sets of characteristics on the basis of the mechanical configuration of the motor vehicle or is parameterized on the basis of the mechanical configuration of the motor vehicle.

10. The method according to claim 1, wherein at least one operator control event produces a pulsed time profile for sensor measured values from at least one sensor element and wherein at least one signal characteristic is/are defined as a width and/or as a height and/or as an edge gradient and/or as a curvature of portions of the sensor pulses and/or as a time offset between two sensor pulses from a sensor element.

11. The method according to claim 1, wherein in the course of the operator control event monitoring the sensor measured values are ascertained by means of the control arrangement on the basis of a signal processing method, wherein the signal processing method is defined by a signal processing set of parameters with signal processing parameters and wherein the signal processing set of parameters is selected from a number of stored signal processing sets of parameters on the basis of the mechanical configuration of the motor vehicle or is parameterized on the basis of the mechanical configuration of the motor vehicle.

12. The method according to claim 9, wherein the monitoring for an operator control event comprises digitization of the sensor measured values and wherein a subsequent evaluation of the digitized measurement data comprising matching against the operator control event set of characteristics is performed on the basis of an evaluation method, wherein the evaluation method is defined by an evaluation set of parameters and wherein the evaluation set of parameters is selected from a number of stored evaluation sets of parameters on the basis of the mechanical configuration of the motor vehicle or is parameterized on the basis of the mechanical configuration of the motor vehicle.

13. The method according to claim 1, wherein in the course of the monitoring for an operator control event the sensor arrangement is actuated by means of the control arrangement on the basis of the mechanical configuration of the motor vehicle.

14. The method according to claim 13, wherein the sensor arrangement has sensor sections on right and left sides of a tow coupling and at least one sensor section in a region of the tow coupling and wherein, when the tow coupling is fitted or adjusted to an operating position, the sensor sections of the sensor arrangement that are on the right and left sides of the tow coupling are actuated or the at least one sensor section of the sensor arrangement that is in the region of the tow coupling is also actuated.

15. A control arrangement for carrying out the method according to claim 1.

16. The method according to claim 4, wherein the sensor arrangement has at least one sensor element in the form of a proximity sensor that is arranged in or on a rear paneling portion of the motor vehicle.

17. The method according to claim 16, wherein the proximity sensor that is arranged in or on the rear paneling portion extends over a portion of the width of the motor vehicle.

18. The method according to claim 17, wherein at least one operator control event is defined as a to and fro movement by the foot of the operator.

19. The method according to claim 18, wherein during the operator control event the at least one sensor element produces a pulsed time profile for the sensor measured values.

20. The method according to claim 6, wherein adjustment or fitting of a tow coupling to an operating position involves the upper threshold and/or the lower threshold being lowered.

* * * * *